(12) United States Patent
Yoneda

(10) Patent No.: US 10,127,942 B2
(45) Date of Patent: Nov. 13, 2018

(54) RECORDING APPARATUS AND RECORDING METHOD

(71) Applicant: CANON KABUSHIKI KAISHA, Tokyo (JP)

(72) Inventor: Shigeru Yoneda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/433,519

(22) Filed: Feb. 15, 2017

(65) Prior Publication Data

US 2017/0270960 A1 Sep. 21, 2017

(30) Foreign Application Priority Data

Mar. 17, 2016 (JP) .................................. 2016-053881

(51) Int. Cl.
*G11B 19/26* (2006.01)
*H04N 9/804* (2006.01)
*G11B 20/18* (2006.01)

(52) U.S. Cl.
CPC .............. *G11B 19/26* (2013.01); *G11B 20/18* (2013.01); *H04N 9/8042* (2013.01)

(58) Field of Classification Search
CPC ...... H04N 9/8042; H04N 5/85; G11B 27/105; G11B 27/3027; G11B 2220/20
USPC ....................................................... 386/263
See application file for complete search history.

(56) References Cited

U.S. PATENT DOCUMENTS 9,152,568 B1 * 10/2015 Seigler ................ G06F 12/0866
2016/0363972 A1 * 12/2016 McNally ................. G06F 1/206

FOREIGN PATENT DOCUMENTS

JP 2001-169162 6/2001

OTHER PUBLICATIONS

Google patent search and scientific and technical information center (stic) search attached.*

* cited by examiner

*Primary Examiner* — William C Vaughn, Jr.
*Assistant Examiner* — Daniel Tekle
(74) *Attorney, Agent, or Firm* — Fitzpatrick, Cella, Harper & Scinto

(57) ABSTRACT

A recording apparatus, including a recorder that records moving image data into a recording medium designated as a recording destination among a plurality of recording media; a reader that reads out, from the recording medium, temperature information on a current temperature of the recording medium; and a controller that controls the recorder based on a recording speed corresponding to a temperature indicated by the temperature information read out by the reader, wherein the controller controls, if a recording speed corresponding to a temperature indicated by first temperature information read out by the reader from a first recording medium designated as the recording destination during recording of the moving image data into the first recording medium is lower than a predetermined recording speed, the recorder to switch the recording destination from the first recording medium to another recording medium and continuously record the moving image data into the another recording medium.

10 Claims, 12 Drawing Sheets

FIG. 2A

| | | 201 |
|---|---|---|
| LOWER THAN 82°C | 200MB/s | |
| 82°C OR HIGHER AND LOWER THAN 85°C | 160MB/s | |
| 85°C OR HIGHER AND LOWER THAN 88°C | 120MB/s | |
| 88°C OR HIGHER | 80MB/s | |

FIG. 2B

| | | 202 |
|---|---|---|
| LOWER THAN 80°C | 290MB/s | |
| 80°C OR HIGHER AND LOWER THAN 83°C | 240MB/s | |
| 83°C OR HIGHER AND LOWER THAN 86°C | 190MB/s | |
| 86°C OR HIGHER | 90MB/s | |

501

| VALUE | DESCRIPTION |
|---|---|
| 0×30 | NOT SCENE RECORDED BY RELAY RECORDING |
| 0×31 | FIRST-HALF SCENE OF RELAY RECORDING |
| 0×32 | SECOND-HALF SCENE OF RELAY RECORDING |

FIG. 6A

| |
|---|
| FILE NUMBER |
| RECORDING MODE |
| APPARATUS ID |
| RECORDING DATE |
| START TIME CODE |
| END TIME CODE |

| | |
|---|---|
| FILE NUMBER | 00001 |
| RECORDING MODE | 100Mbps |
| APPARATUS ID | C100 |
| RECORDING DATE | 2016/03/01 |
| START TIME CODE | 00.00.00.00 |
| END TIME CODE | 00.00.10.15 |

602

| | |
|---|---|
| FILE NUMBER | 00002 |
| RECORDING MODE | 100Mbps |
| APPARATUS ID | C100 |
| RECORDING DATE | 2016/03/01 |
| START TIME CODE | 00.00.10.16 |
| END TIME CODE | 00.00.29.30 |

| LOWER THAN 80°C | 250MB/s |
|---|---|
| 80°C OR HIGHER AND LOWER THAN 83°C | 200MB/s |
| 83°C OR HIGHER AND LOWER THAN 86°C | 150MB/s |
| 86°C OR HIGHER | 100MB/s |

RECORDING APPARATUS AND RECORDING METHOD

BACKGROUND OF THE INVENTION

Field of the Invention

The present disclosure relates to a recording apparatus and a recording method.

Description of the Related Art

Hitherto, there has been known an image recording apparatus configured to record moving image data into a recording medium, for example, a memory card. Further, there has been proposed an apparatus configured to detect an ambient temperature of a recording medium to prohibit recording into the recording medium when the ambient temperature exceeds a heat-resistant temperature of the recording medium (see Japanese Patent Application Laid-Open No. 2001-169162).

However, hitherto, when a temperature of a recording medium has increased excessively during recording of moving image data, a moving image to a desired time point cannot be acquired.

SUMMARY OF THE INVENTION

According to an aspect of an embodiment of the present invention, there is provided a recording apparatus, including a recorder that records moving image data into a recording medium designated as a recording destination among a plurality of recording media; a reader that reads out, from the recording medium, temperature information on a current temperature of the recording medium; and a controller that controls the recorder based on a recording speed corresponding to a temperature indicated by the temperature information read out by the reader, wherein the controller controls, if a recording speed corresponding to a temperature indicated by first temperature information read out by the reader from a first recording medium designated as the recording destination during recording of the moving image data into the first recording medium is lower than a predetermined recording speed, the recorder to switch the recording destination from the first recording medium to another recording medium and continuously record the moving image data into the another recording medium.

According to another aspect of an embodiment of the present invention, there is provided a recording method, including: recording moving image data into a recording medium designated as a recording destination among a plurality of recording media; reading out, from the recording medium, temperature information on a current temperature of the recording medium; and controlling the recording the moving image data based on a recording speed corresponding to a temperature indicated by the temperature information read out in the reading out, wherein the controlling, if a recording speed corresponding to a temperature indicated by first temperature information read out in the reading out from a first recording medium designated as the recording destination during recording of the moving image data into the first recording medium is lower than a predetermined recording speed, switches the recording destination from the first recording medium to another recording medium so as to continuously record the moving image data into the another recording medium.

Further features of the present invention will become apparent from the following description of exemplary embodiments with reference to the attached drawings.

BRIEF DESCRIPTION OF THE DRAWINGS

FIG. 2A and FIG. 2B are tables for showing management data indicating relationships between temperatures and recordable rates corresponding to the respective temperatures in respective recording media.

FIG. 6A and FIG. 6B are tables for showing examples of second additional information.

FIG. 13 is a table for showing management data indicating a relationship between temperatures and recordable rates in a recording medium.

DESCRIPTION OF THE EMBODIMENTS

Figure 1:
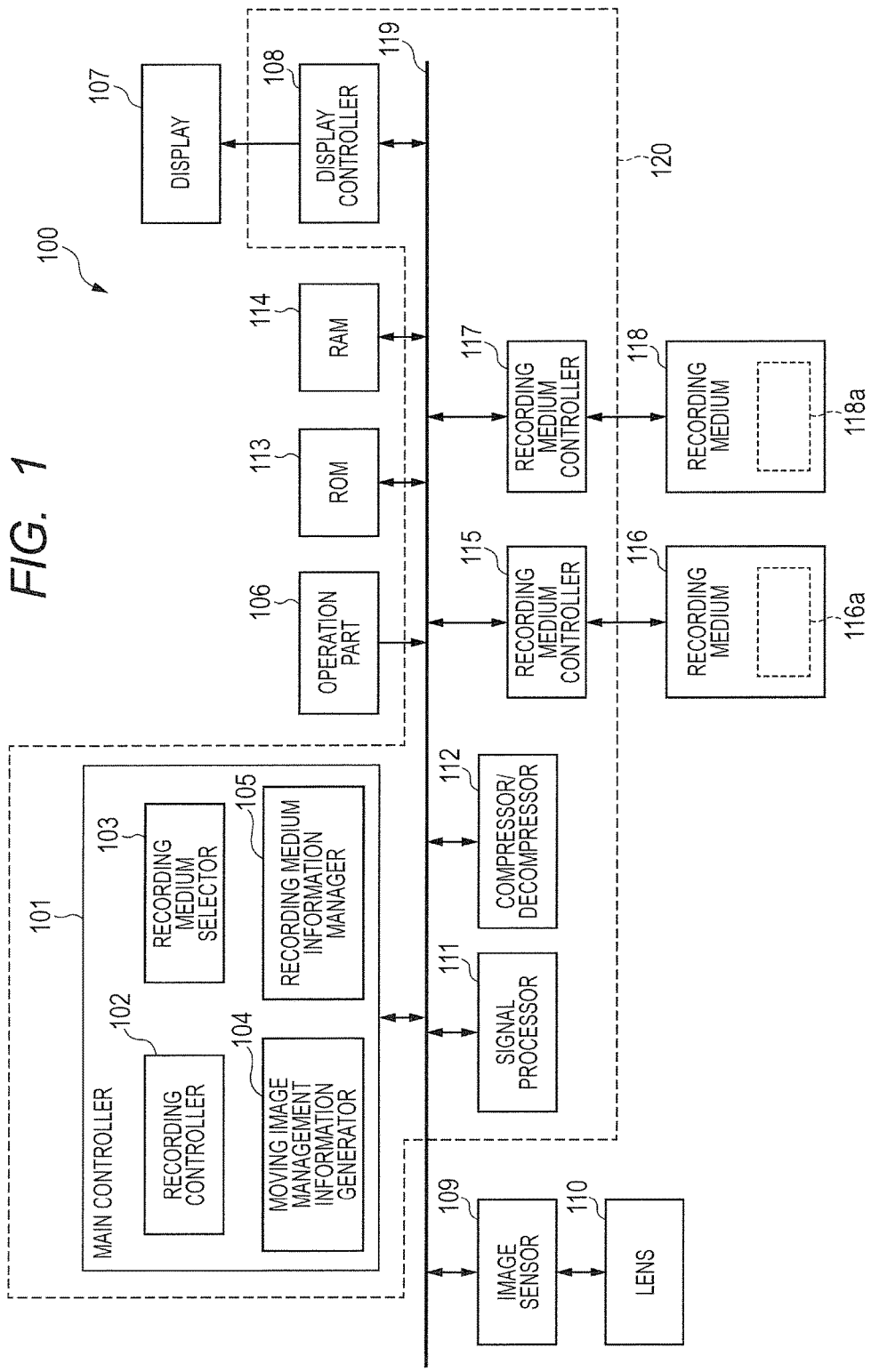
FIG. 1 is a block diagram for illustrating a configuration of an image recording apparatus according to a first embodiment of the present invention.

Exemplary embodiments of the present invention are hereinafter described in detail with reference to the attached drawings. The present invention is not limited to the embodiments to be described below, and may be appropriately changed without departing from the gist thereof. Further, in the drawings to be described below, components having the same functions are denoted by the same reference numerals, and description thereof may be omitted or simplified.

First Embodiment

An image recording apparatus and an image recording method according to a first embodiment of the present invention are described with reference to FIG. 1 to FIG. 3. FIG. 1 is a block diagram for illustrating a configuration of the image recording apparatus according to this embodiment. In this embodiment, a case where the image recording apparatus (recording apparatus) 100 includes an image sensor (imaging part, image pickup unit) 109, that is, the image recording apparatus 100 is an image pickup apparatus is described as an example, but the present invention is not limited thereto. For example, the image recording apparatus 100 may not include the image sensor 109. In this case, moving image data is input to the image recording apparatus 100 via an input part (not shown), which is provided in place of the image sensor 109 and a lens 110. Further, in the following, a case where the image recording apparatus 100 includes a display 107 is described as an example, but the image recording apparatus 100 may not include the display 107.

A main controller 101 is configured to control the entire image recording apparatus (image processing apparatus) 100, and is a central processing unit (CPU). The main controller 101 controls respective parts of the image recording apparatus 100 in accordance with a program stored in a read only memory (ROM) 113, information stored in a random access memory (RAM) 114, information sent from an operation part (operation section) 106, and other such data. The main controller 101 includes, as its functional blocks, a recording controller 102, a recording medium selector (recording medium selection part) 103, a moving image management information generator (moving image management information generation part) 104, and a recording medium information manager (recording medium information management part) 105. The recording controller 102 and recording medium controllers 115 and 117 operate in cooperation with one another to function as a recorder (recording part, recording unit) configured to record the moving image data (moving image file) in any one of a plurality of recording media 116 and 118. The recording controller 102, the recording medium selector 103, the moving image management information generator 104, and the recording medium information manager 105 are the functional blocks of the main controller 101, for example. The main controller 101, a signal processor (signal processing part) 111, a compressor/decompressor (compression/decompression part, coder/decoder) 112, the recording medium controllers 115 and 117, and a display controller 108 are functional blocks of a processor (processing part) 120. The processor 120 may be formed of, for example, a processor such as a central processing unit (CPU) or a digital signal processor (DSP). The processor 120 may be formed of a plurality of processors.

The operation part 106 is for inputting various operations, and includes, for example, a button, a switch, and others. Examples of the button include a power button, an instruction button for starting recording, an instruction button for stopping recording, a menu display button, and an enter button. Examples of the switch include a mode switch. When the operation part 106 is operated by a user, the operation part 106 transmits an operation signal corresponding to details of an operation to the main controller 101. Further, various types of members to be operated such as a cursor key, a pointing device, a touch panel, and a dial may be used for the operation part 106. The respective operation members of the operation part 106 can also be implemented by various functional icons displayed on the display 107. The user may perform an operation by appropriately selecting one or more of those functional icons.

As the display 107, for example, a liquid crystal display device is used. The display 107 is configured to appropriately display an image, a menu screen, and other necessary information under the control of the display controller 108. The display controller 108 is configured to transmit data of an image to be displayed on the display 107 to the display 107 and to control a light emission amount of a backlight of the display 107.

The lens 110 is a lens unit including a fixed lens group for focusing light, a variable magnification lens group, and a diaphragm. The lens 110 further includes a correction lens group having both a function of correcting an imaging position displaced by the movement of the variable magnification lens group and a function of performing focus adjustment.

The image sensor (image pickup element) 109 is configured to perform photoelectric conversion, to thereby generate an image signal (image data) from an optical image imaged on an image pickup surface by the lens 110. The image sensor 109 is capable of acquiring, for example, still image data of 1,920 pixels×1,080 pixels. The image sensor 109 is also capable of acquiring moving image data of 1,920 pixels×1,080 pixels at 60 frames per second.

The signal processor (image processor, image processing part) 111 is configured to calculate a gain value of white balance suited to the image data sent from the image sensor 109, and multiply the image data by the calculated gain value. After that, processing of conversion into a YCbCr signal is performed on the image data, and the image data converted into the YCbCr signal is output to the RAM 114. Further, the signal processor 111 converts each frame of the moving image data sent from the image sensor 109 into image data corresponding to a pixel number set in advance by the user, and sequentially outputs the resultant image data.

The compressor/decompressor (CODEC: coder/decoder) 112 is configured to compress the moving image data sent from the RAM 114 by a known coding scheme, for example, MPEG, and output the compressed moving image data to the RAM 114. The compressor/decompressor 112 also has a function (decoding function) of decompressing the moving image data compressed by MPEG, for example. The compressor/decompressor 112 further has a function of changing a data transfer rate of the moving image data based on a transfer rate of the moving image data set in advance by the user.

The ROM 113 is a non-volatile memory, and a flash ROM is used as the ROM 113, for example. In the ROM 113, a program to be executed by the main controller 101 and others are stored. Further, for example, a part of areas of the ROM 113 is used for backup, and a state of a system and others are stored therein. The RAM 114 is a volatile memory. The main controller 101, the signal processor 111, the compressor/decompressor 112, and other components use the RAM 114 as a work memory.

The recording medium controller 115 is a SATA controller, for example. The recording medium controller 115 is configured to record to the recording medium 116 the moving image data and others stored in the RAM 114 in accordance with a format compatible with a computer, for example, an exFAT file system. The recording medium 116 is a recording medium that can be mounted to and removed from the image recording apparatus 100, and can also be mounted to a PC or the like. Examples of the recording medium 116 include a memory card. The recording medium controller 117 has a function similar to that of the recording medium controller 115, and is configured to record the moving image data and others to the recording medium 118. A bus line 119 connects each of the functional blocks to one another. Each of the functional blocks exchanges data with each other via the bus line 119.

FIG. 2A and FIG. 2B are tables for showing management data indicating temperatures and recordable rates corresponding to the respective temperatures in the respective recording media. FIG. 2A is management data (table) 201 indicating temperatures and recordable rates corresponding to the respective temperatures in the recording medium 116. FIG. 2B is management data 202 indicating temperatures and recordable rates corresponding to the respective temperatures in the recording medium 118.

An upper limit of the recording speed corresponding to the temperature (internal temperature) of each of the recording media 116 and 118, that is, the recordable rate, is defined in advance for each type of the recording medium 116 and 118. The recording medium information manager 105 is configured to hold the pieces of management data 201 and 202 indicating correspondence between the temperatures and the recordable rates of the recording media 116 and 118, respectively, for each type of the recording medium 116 and 118. The recording medium information manager 105 functions as a holding part configured to hold the pieces of management data 201 and 202. The recording medium information manager 105 detects the type of each of the recording media 116 and 118 mounted to the image recording apparatus 100, and determines one of the pieces of management data 201 and 202 for the detected one of the recording media 116 and 118 based on a result of the detection.

In the above, the case where the pieces of management data 201 and 202 are held in the recording medium information manager 105 is described as an example, but the present invention is not limited thereto. For example, the above-mentioned pieces of management data 201 and 202 may be held inside the recording media 116 and 118. In this case, the recording media 116 and 118 function as a holding part configured to hold the pieces of management data 201 and 202. In this case, the pieces of management data 201 and 202 stored inside the recording media 116 and 118 are read out appropriately by, for example, the recording medium information manager 105.

The recording medium information manager 105 is configured to acquire temperature information (predetermined information or internal temperature information) of each of the recording media 116 and 118. The recording media 116 and 118 respectively include temperature information generators (information generators) 116a and 118a configured to generate information on current temperatures inside the recording media 116 and 118, that is, the temperature information thereof. As each of the temperature information generators 116a and 118a, a temperature sensor integrated circuit (IC) (semiconductor temperature sensor) may be used, for example. The temperature sensor IC of respective recording medium 116 and 118 is configured to measure the current temperature inside one of the recording media 116 and 118, and based on a result of the measurement, generate, for example, digital temperature information indicating the measured temperature. To acquire the temperature information, the recording medium information manager 105 uses the recording medium controllers 115 and 117 to output commands for requesting the temperature information to the recording media 116 and 118. In response to the commands for requesting the temperature information, the recording media 116 and 118 generate the temperature information and output the generated temperature information to the recording medium controllers 115 and 117, respectively. The recording medium information manager 105 acquires the temperature information from the recording medium 116 via the recording medium controller 115, and acquires the temperature information from the recording medium 118 via the recording medium controller 117. As the recording media 116 and 118 capable of generating the temperature information, there is known, for example, a recording medium equipped with a Self-Monitoring Analysis and Reporting Technology (S.M.A.R.T.) function. The recording media 116 and 118 are not limited to the recording medium equipped with the S.M.A.R.T. function. Various recording media capable of generating the temperature information may be used appropriately as the recording media 116 and 118.

When the user operates the operation part 106 to set power of the image recording apparatus 100 to an on state, the main controller 101 starts control of the image sensor 109. The main controller 101 displays an image acquired by the image sensor 109 on the display 107 and sets the image recording apparatus 100 to a recording standby state. In the recording standby state, the user may operate the operation part 106 to select a recording medium to be a recording destination of the moving image data from the two recording media 116 and 118. The recording medium selector 103 selects the recording medium selected by the user as the recording destination of the moving image data. The user may operate the operation part 106 to appropriately set a pixel number (screen size), frame rate, data transfer rate, or the like of the moving image data to be recorded into the recording media 116 and 118.

When the user operates the operation part 106 to instruct to start recording, the main controller 101 controls respective parts of the image recording apparatus 100 to start recording of the moving image data. Specifically, the moving image data acquired by the image sensor 109 is compressed by the compressor/decompressor 112, and the resultant moving image data is recorded into the recording medium selected in advance as the recording destination. At this time, the main controller 101 controls the image sensor 109 such that the moving image data having a frame rate set by the user is output. Further, the main controller 101 controls the signal processor 111 such that the moving image data having a pixel number set by the user is output. Still further, the main controller 101 controls the compressor/decompressor 112 such that the moving image data is output at a transfer rate set in advance.

During the recording of the moving image data, the recording medium information manager 105 regularly acquires the temperature information from the recording medium being the recording destination at a predetermined timing. Then, during the recording of the moving image data into a given recording medium, when a necessary recording rate can no longer be secured due to an increase in temperature of the given recording medium, the recording medium selector 103 automatically switches the recording destination of the moving image data to another recording medium. When the user operates the operation part 106 to instruct to stop recording, the main controller 101 stops the recording of the moving image data into the recording medium.

Figure 3:
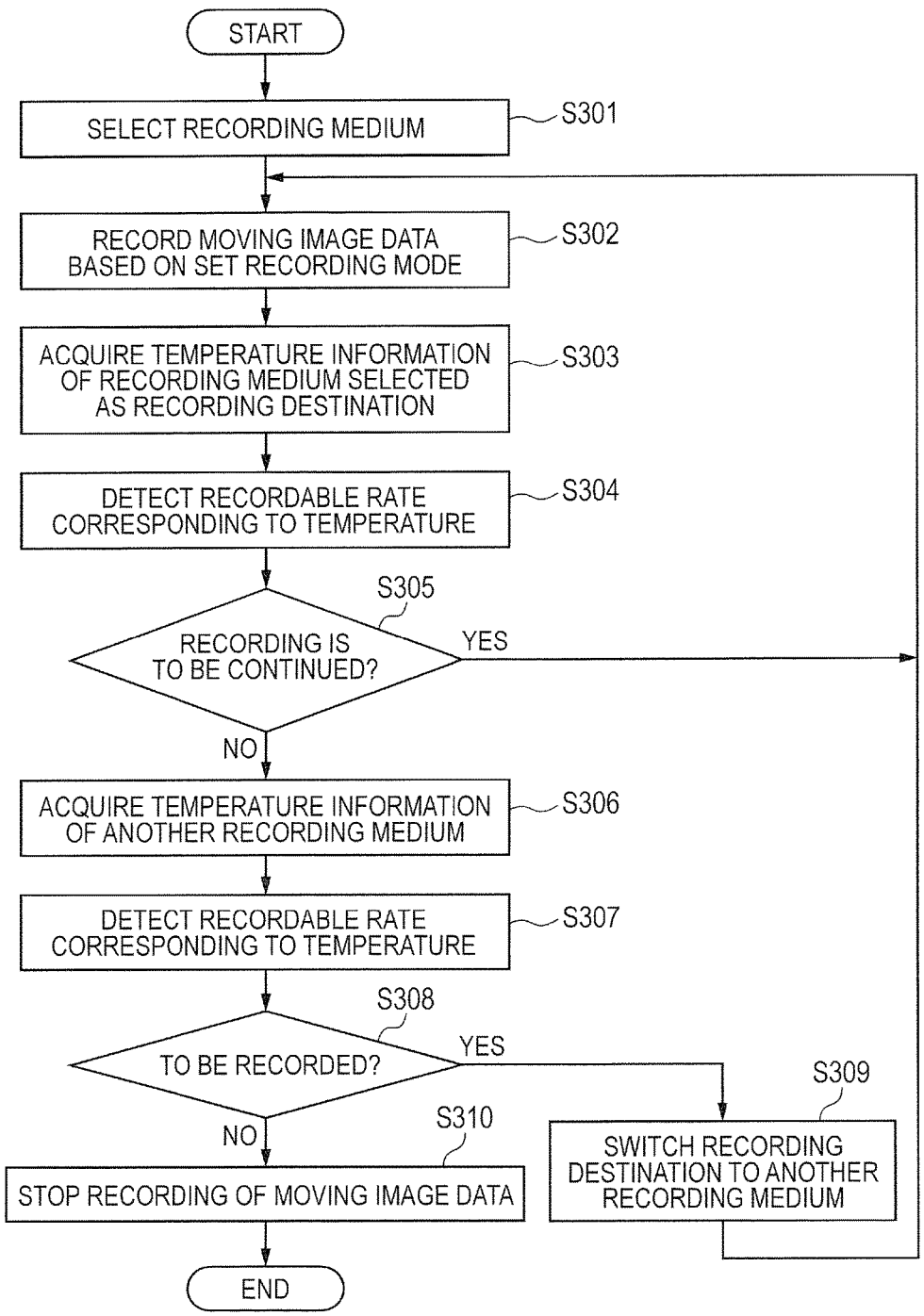
FIG. 3 is a flowchart for illustrating an operation of the image recording apparatus according to the first embodiment.

FIG. 3 is a flowchart for illustrating an operation of the image recording apparatus according to this embodiment.

First, in Step S301, any one of the recording media 116 and 118 is selected by the user as the recording destination of the moving image data. In the following, a case where the recording medium 116 is selected by the user as the recording destination of the moving image data is described as an example. The recording medium selector 103 selects the recording medium 116 as the recording destination of the moving image data based on the user's select. In Step S302, the moving image data is recorded into the recording medium 116 based on a recording mode set in advance by the user. A combination of a pixel number, frame rate, and data transfer rate of the moving image recorded into the recording medium 116 is hereinafter referred to as "recording mode". There are a plurality of recording modes having different data transfer rates (recording speeds), and any one of the plurality of recording modes is selected by the user. The moving image is recorded into the recording medium 116 at a predetermined transfer rate (predetermined recording speed) corresponding to the selected recording mode. In the following, a case where the transfer rate of the moving image data is set to, for example, 100 megabytes per second (MB/s) is described as an example. During the recording of the moving image data, the management information of the moving image data is generated by the moving image management information generator 104, and the generated management information is recorded into the recording medium 116.

In Step S303, the temperature information of the recording medium 116 selected as the recording destination is acquired by the recording medium information manager 105. In Step S304, the recordable rate of the recording medium 116 corresponding to the temperature information of the recording medium 116 is detected by the recording medium information manager 105 based on the management data 201. For example, when the internal temperature of the recording medium 116 is 89° C., as can be understood from FIG. 2A, the recordable rate of the recording medium 116 is 80 MB/s. The recording medium information manager 105 functions as a recording speed determination part configured to determine the recordable rate of the recording medium based on the management data indicating the recordable rate corresponding to the temperature of the recording medium and on the temperature information of the recording medium. The recordable rate includes a margin, and hence even when the moving image data is recorded under a state in which the recordable rate of the recording medium is exceeded, the image data can be recorded normally in some cases. The recordable rate indicates a recording speed at which the moving image data can be securely recorded.

In Step S305, whether or not to continue the recording of the moving image data into the recording medium 116 is determined by the recording medium information manager 105, for example. The recording medium information manager 105 functions as a determination part configured to determine whether or not to continue the recording of the moving image data into the recording medium 116 during the recording of the moving image data into the recording medium 116 based on the predetermined information corresponding to the temperature of the recording medium 116. The recording medium information manager 105 determines the recording medium whose recordable rate detected in Step S304 is the predetermined transfer rate set in advance or higher, that is, the predetermined recording speed or higher, as the recording medium into which the moving image data is allowed to be recorded. The recording medium information manager 105 determines the recording medium whose recordable rate is lower than the predetermined transfer rate set in advance, that is, lower than the predetermined recording speed, as the recording medium to which the moving image data is not allowed to be recorded. As described above, the transfer rate of the moving image data is set to 100 MB/s, for example. As compared with this, the recordable rate of the recording medium 116 at the time when the internal temperature of the recording medium 116 is 89° C. is 80 MB/s, for example. In this case, the recordable rate of the recording medium 116 is lower than the transfer rate of the moving image data. When the recording of the moving image data into the recording medium 116 is continued in such a case, there is a fear that the moving image data may not be normally recorded into the recording medium 116. Therefore, when the recordable rate of the recording medium 116 is lower than the transfer rate of the moving image data, it is determined that recording of the moving image data into the recording medium 116 is not to be continued ("NO" in Step S305). Then, the processing proceeds to Step S306. On the other hand, when the internal temperature of the recording medium 116 is not too high, and the recordable rate of the recording medium 116 is the transfer rate of the moving image data or higher, the moving image data may be securely recorded into the recording medium 116. In this case, it is determined that the recording of the moving image data into the recording medium 116 is to be continued ("YES" in Step S305). Then, the processing returns to Step S302, and the recording of the moving image data into the recording medium 116 is continued.

In Step S306, the temperature information of the recording medium 118, which is different from the recording medium 116, is acquired by the recording medium information manager 105. In Step S307, the recordable rate of the recording medium 118 corresponding to the temperature information of the recording medium 118 is detected by the recording medium information manager 105 based on the management data 202. For example, when the internal temperature of the recording medium 118 is 82° C., as can be understood from FIG. 2B, the recordable rate of the recording medium 118 is 240 MB/s.

In Step S308, whether or not to record the moving image data into the recording medium 118 is determined by the recording medium information manager 105, for example. Whether or not to record the moving image data into the recording medium 118 is determined based on whether or not the recordable rate of the recording medium 118 is the predetermined transfer rate set in advance or higher. As described above, the transfer rate of the moving image data is set to 100 MB/s, for example. As compared with this, the recordable rate of the recording medium 118 at the time when the internal temperature is 82° C. is 240 MB/s, for example. In this case, the recordable rate of the recording medium 118 is the transfer rate of the moving image data or higher. Therefore, in this case, the moving image data can be recorded into the recording medium 118 without a problem. When it is determined that the moving image data is to be recorded into the recording medium 118 ("YES" in Step S308), the processing proceeds to Step S309.

In Step S309, the recording destination of the moving image data is switched by the recording medium selector 103 to the recording medium 118, which is different from the recording medium 116. The recording medium selector 103 functions as a controller configured to switch, when the recording medium information manager 105 determines that recording of the moving image data into the recording medium 116 is not to be continued, the recording destination of the moving image data to another recording medium 118, which is different from one recording medium 116, under a predetermined condition. The main controller 101 controls the recording medium controllers 115 and 117 such that the recording of the moving image data into the recording medium 116 is stopped and the recording of the moving image data is continued by automatically starting recording of the moving image data into the recording medium 118. After that, the processing returns to Step S302. When the recording destination of the moving image data is switched from the recording medium 116 to the recording medium 118, it is preferred that the following processing be performed. Specifically, information indicating that moving image data to be recorded into the recording medium 118 is continuous with the moving image data that has already been recorded into the recording medium 116 is generated by the moving image management information generator 104, and the generated information is recorded. Through this processing, the moving image data that has been recorded into the recording medium 116 and the moving image data to be recorded into the recording medium 118 can be securely combined with each other after the recording of the moving image data is completed. When it is determined that the recording of the moving image data into the recording medium 118 is not to be continued ("NO" in Step S308), the processing proceeds to Step S310, and the recording of the moving image data is stopped.

As described above, the recording apparatus according to this embodiment has the function of, when recording of the moving image data into the recording medium can no longer be performed due to an increase in temperature of the recording medium into which the moving image data is being recorded, switching the recording destination of the moving image data to another recording medium to continue the recording, that is, a function of relay recording. With the relay recording, as described above, for example, when the temperature of the recording medium 116 increases during the recording of the moving image data into the recording medium 116, and it becomes difficult to write the data at a desired writing speed, the recording destination of the moving image data is switched from the recording medium 116 to the recording medium 118, for example. Then, the recording of the moving image data into the recording medium 118 is continued. With the relay recording, during a period from an instruction to start recording to an instruction to stop the recording, the moving image data is recorded into both of the two recording media 116 and 118.

In the processing of FIG. 3, after it is determined in Step S305 that the recording is not to be continued, the recording medium information manager 105 acquires in Step S306 the temperature information of another recording medium. However, during the recording to one of the recording media, the temperature information may be regularly acquired from another recording medium. In this case, it suffices that the recording medium information manager 105 store the temperature information acquired from another recording medium in the RAM 114 and then, in Step S306, the temperature information of another recording medium be read out from the RAM 114.

Figures 4, 5:
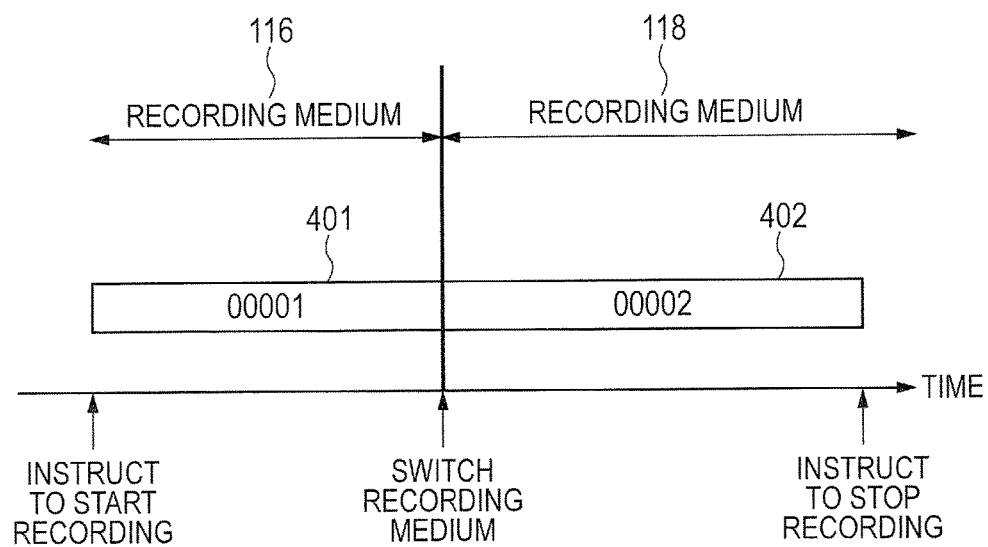
FIG. 4 is a diagram for illustrating an example of moving image files to be recorded by the image recording apparatus according to the first embodiment.
FIG. 5 is a table for showing an example of first additional information.

In order to enable the moving image data recorded into both of the two recording media 116 and 118 to be combined with each other later, in this embodiment, additional information is recorded together with the moving image data. In the following, a case where a plurality of pieces of additional information are recorded is described as an example. Examples of first additional information among the plurality of pieces of additional information include relay recording information. The relay recording information is information for identifying that the moving image data is recorded into both of two recording media. FIG. 5 is a table for showing an example of the first additional information. As shown in FIG. 5, for example, there are three types of values as the first additional information 501. When the value of the first additional information 501 is "0x30" (first value), for example, this value indicates that the relevant scene is not a scene recorded by the relay recording, that is, is not moving image data recorded by the relay recording. When the value of the first additional information 501 is "0x31" (second value), for example, this value indicates that the relevant scene is the moving image data recorded by the relay recording and is a first-half scene. When the value of the first additional information 501 is "0x32" (third value), this value indicates that the relevant scene is the moving image data recorded by the relay recording and is a second-half scene.

In addition to the first additional information 501 described above, second additional information 601 is also recorded. FIG. 6A and FIG. 6B are tables for showing examples of the second additional information 601. As shown in FIG. 6A, the second additional information 601 includes a plurality of items. The second additional information 601 includes, for example, a file number, a recording mode, an apparatus ID that is identification information of the image recording apparatus 100, a recording date of the moving image data, a time code (start time code) at the start of recording of the moving image data, and a time code (end time code) at the end of recording of the moving image data. The file number is information added to each moving image file. The recording mode is, for example, information on the data transfer rate of the recorded moving image data. The recording date indicates a date on which recording is started. The start time code and the end time code indicate time codes of a first frame and last frame of the moving image data stored in the moving image file, respectively. In this embodiment, for each frame of the recorded moving image data, time code information indicating a period of time (frame) from the start of recording is generated to be recorded. Further, when the user gives an instruction to start recording, the value of the time code is set to "00:00:00:00 (hour:minute:second:frame)". When the frame rate of a moving image to be recorded is 60 frames/second, the value of the frame in the time code takes any one of 0 to 59.

The main controller 101 generates the first additional information 501 and the second additional information 601 described above and stores the generated information in the RAM 114, for example. The main controller 101 then controls the recording medium controllers 115 and 117 to record the first additional information 501 and the second additional information 601 in association with each moving image file. In the above, the case where the first additional information 501 and the second additional information 601 are recorded by being stored in the moving image file is described as an example, but those pieces of additional information 501 and 502 may be recorded as a file different from the moving image file.

FIG. 4 is a diagram for illustrating an example of the moving image files to be recorded by the image recording apparatus 100. FIG. 4 is an illustration of an example of the moving image files to be recorded when the relay recording is performed. In response to an instruction to start recording under a state in which the recording medium 116 is selected, a moving image file 401 having a file number "00001" is recorded. When the temperature of the recording medium 116 becomes higher during the recording of the moving image file 401, and it becomes difficult to record data at a desired recording speed, the recording of the moving image file 401 is stopped, and the recording destination is switched to the recording medium 118. Then, a moving image file 402 having a file number "00002" is recorded into the recording medium 118. After that, in response to an instruction to stop the recording, the recording of the moving image file 402 is stopped. Further, when the relay recording is performed as illustrated in FIG. 4, the value of the first additional information 501 of the moving image file 401 is set to "0x31", and the value of the first additional information 501 of the moving image file 402 is set to "0x32". When the relay recording is not performed, the value of the first additional information 501 recorded together with the moving image file is set to "0x30".

Figure 7:
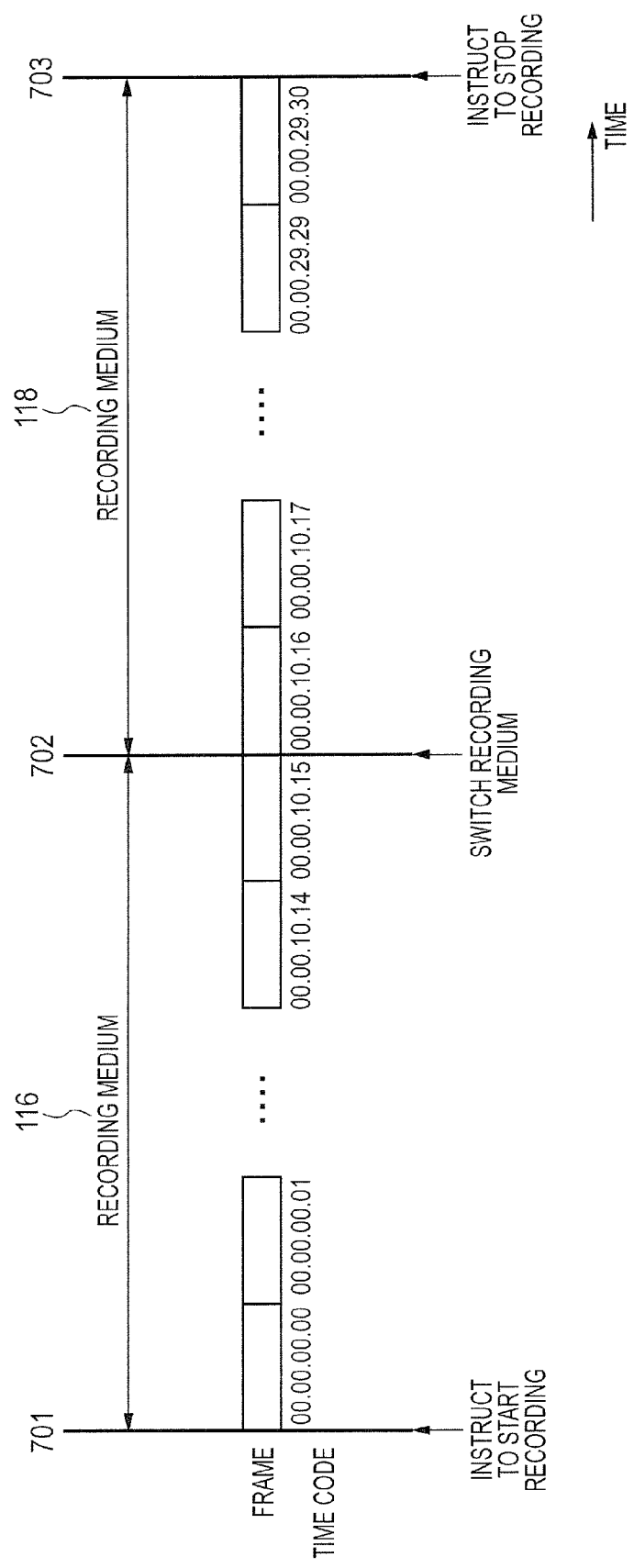
FIG. 7 is a diagram for illustrating frames to be recorded into each of the moving image files and time codes of the respective frames when relay recording is performed.

FIG. 7 is a diagram for illustrating frames to be recorded into each of the moving image files 401 and 402 and time codes of the respective frames when the relay recording is performed. When the instruction to start the recording is given at a timing 701 under the state in which the recording medium 116 is selected, a time code value "00:00:00:00" is added to the first frame, and the recording is started. After that, at a timing 702, when the recording destination is switched from the recording medium 116 to the recording medium 118, a time code value "00:00:10:15" is added to the last frame of the moving image file 401 that has been recorded into the recording medium 116. Further, a time code value "00:00:10:16" is added to the first frame of the moving image file 402 to be recorded into the recording medium 118. As described above, at the time of the relay recording, the time code value of the last frame of the moving image file 401 and the time code value added to the first frame of the moving image file 402 are continuous. Therefore, when a value obtained by adding a value corresponding to one frame to the time code of the last frame of the moving image file 401 is the time code of the first frame of the moving image file 402, it is understood that those two moving image files are recorded continuously by the relay recording. After that, when the instruction to stop the recording is given at a timing 703, the recording of the moving image file 402 is stopped. As shown in FIG. 6B, in second additional information 602 of the moving image file 401, "00:00:00:00" is stored as the start time code value and "00:00:10:15" is stored as the end time code value. Meanwhile, in second additional information 603 of the moving image file 402, "00:00:10:16" is stored as the start time code value and "00:00:29:30" is stored as the end time code value.

Figure 8:
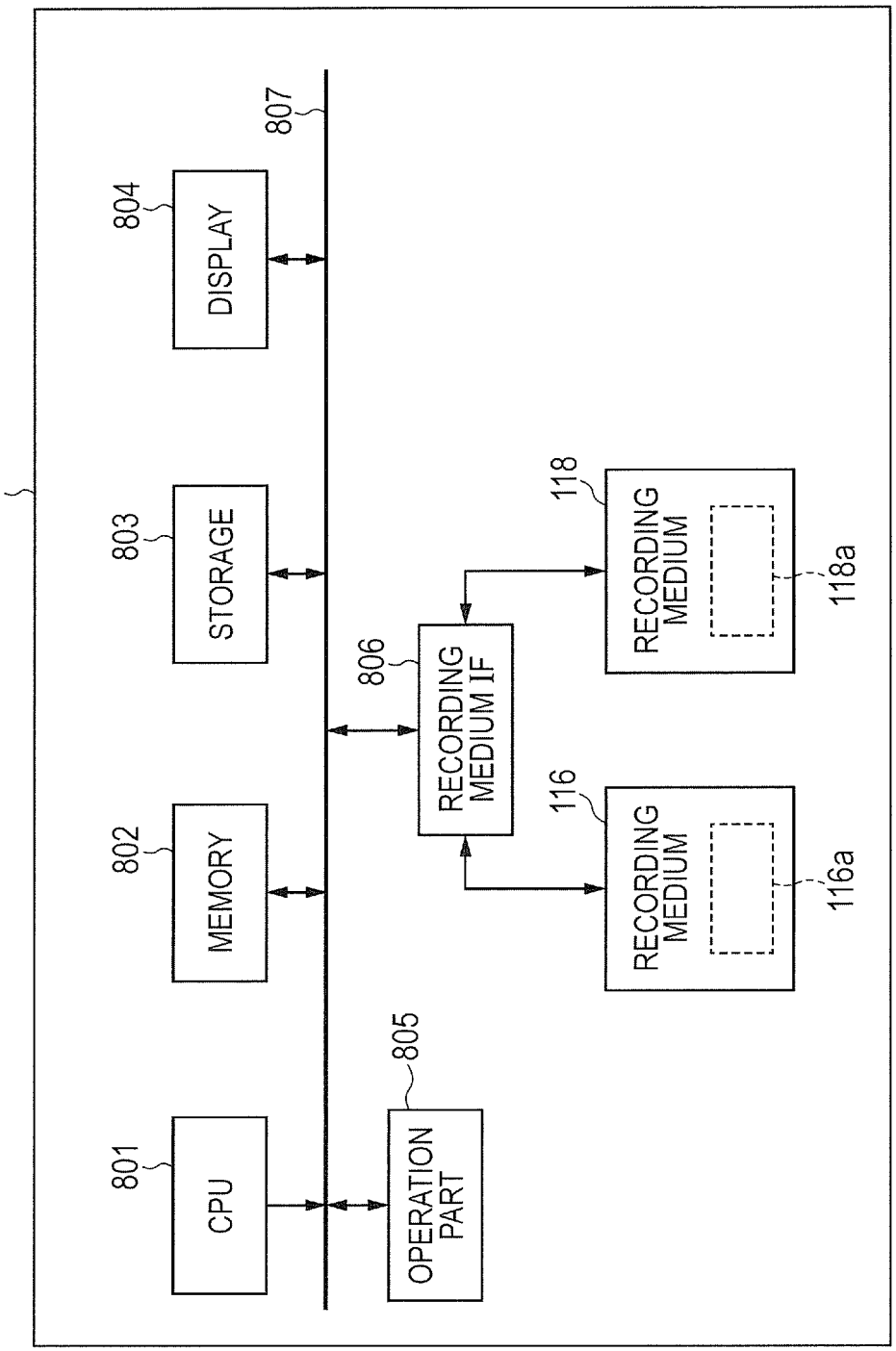
FIG. 8 is a block diagram for illustrating a configuration of an image processing apparatus according to the first embodiment.

Next, an image processing apparatus configured to combine two moving image files recorded by the relay recording is described. FIG. 8 is a block diagram for illustrating a configuration of an image processing apparatus 800 according to this embodiment. The image processing apparatus 800 may be implemented by a general personal computer (PC), for example.

In the image processing apparatus 800, a CPU 801 is configured to control respective parts in accordance with application software stored in a storage (storage part, storage unit) 803. A memory 802 functions as a cache memory for software stored in the storage 803 and as a work memory of the CPU 801. The storage 803 includes a large-capacity non-volatile memory, for example, a hard disk drive (HDD) or a flash memory drive (SSD). The storage 803 is configured to store software. As described later, the storage 803 is also configured to store the moving image files read out from the recording media 116 and 118, the combined moving image files, and other data. A display 804 is configured to display an operation screen to be operated by the user and other information. An operation part 805 includes a keyboard, a mouse, and switches and others that can be operated by the user. A recording medium interface (IF) 806 includes mounting portions to which the recording media 116 and 118 can be mounted, and is configured to read out the moving image files and various types of data from the recording media 116 and 118 mounted thereto, and to write the moving image files and other data into the recording media 116 and 118. The recording medium IF 706 includes two mounting portions to which the recording medium 116 and the recording medium 118 are to be mounted. Therefore, the recording medium 116 and the recording medium 118 can be mounted to the image processing apparatus 800 at the same time. A bus 807 is used to transmit/receive data and others between the respective parts.

Figure 9:
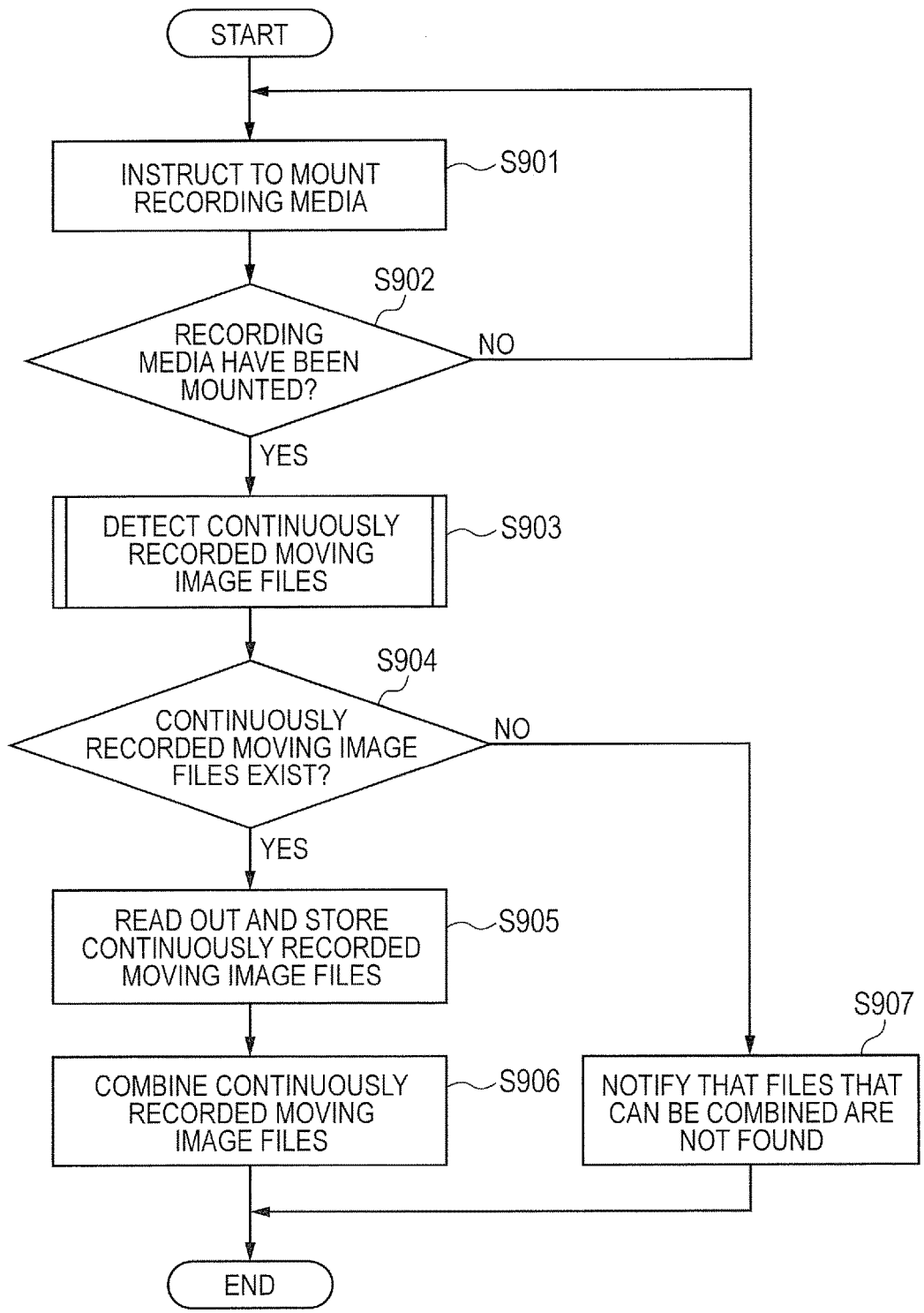
FIG. 9 is a flowchart for illustrating processing of combining the moving image files performed by the image processing apparatus.
Figure 10:
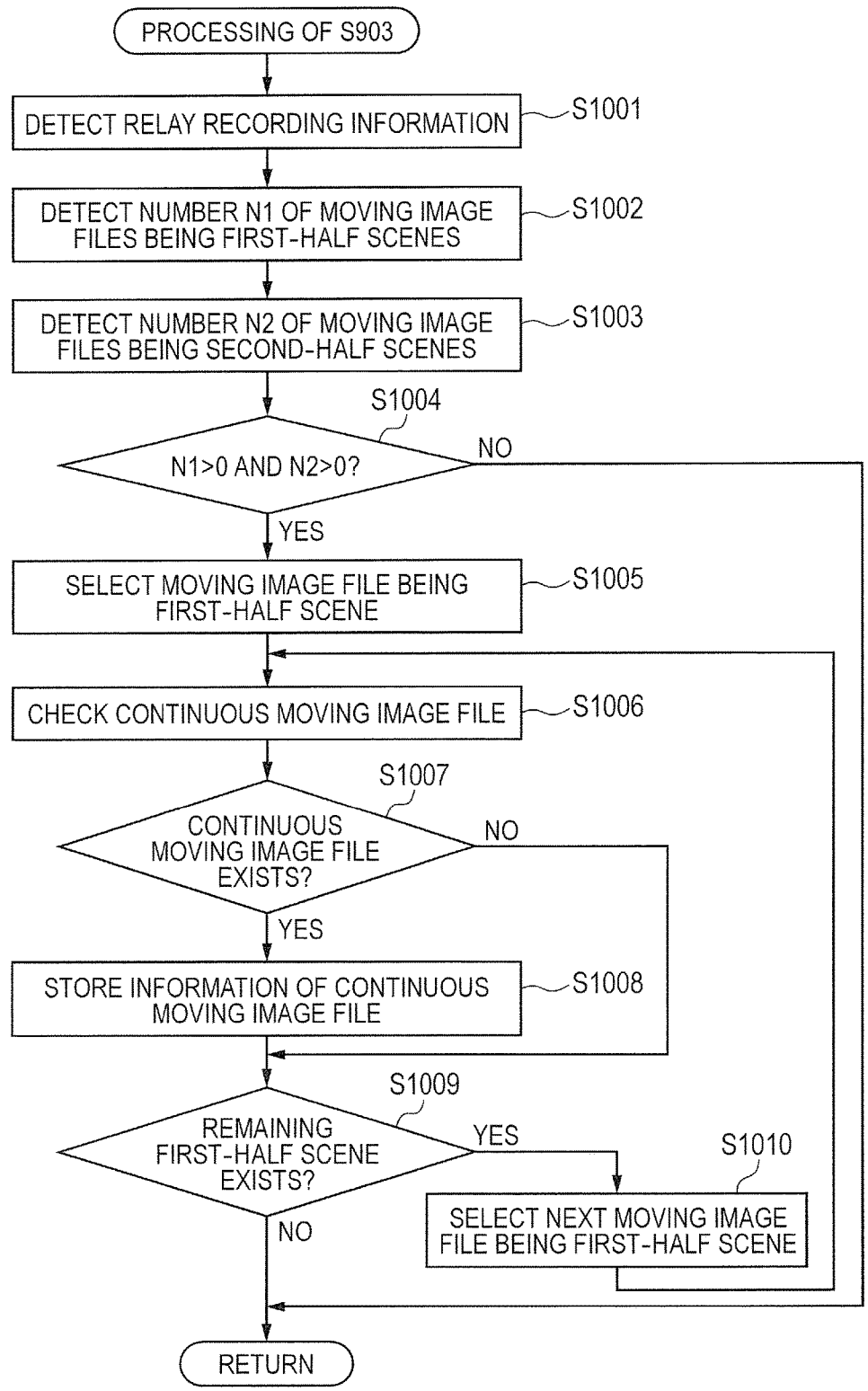
FIG. 10 is a flowchart for illustrating the processing of combining the moving image files performed by the image processing apparatus.

FIG. 9 and FIG. 10 are flowcharts for illustrating processing of combining the moving image files performed by the image processing apparatus 800. The processing illustrated in FIG. 9 and FIG. 10 is executed by the CPU 801, for example. In Step S901, a screen for instructing the user to mount the two recording media 116 and 118 to the recording medium IF 806 is displayed on the display 804. When it is not detected that the two recording media 116 and 118 have been mounted to the recording medium IF 806 ("NO" in Step S902), the CPU 801 waits for the two recording media 116 and 118 to be mounted. When it is detected that the two recording media 116 and 118 have been mounted to the recording medium IF 806 ("YES" in Step S902), the processing proceeds to Step S903. In Step S903, the CPU 801 detects the moving image files that have been recorded continuously in the two recording media 116 and 118 by the relay recording.

FIG. 10 is a flowchart for illustrating the detection processing performed in Step S903. In Step S1001, the CPU 801 reads out the first additional information 501, that is, the relay recording information, of all of the moving image files from the two recording media 116 and 118 via the recording medium IF 806, and stores the read first additional information 501 in the storage 803. The CPU 801 then detects the moving image file being the first-half scene from the moving image files recorded into the two recording media 116 and 118 based on the value of the first additional information 501, and detects a number N1 of those files (Step S1002). As described above, when the value of the first additional information 501 is "0x31", for example, the value indicates that the relevant file is the moving image file being the first-half scene. Next, the CPU 801 detects the moving image file being the second-half scene from the moving image files recorded into the two recording media 116 and 118, and detects a number N2 of those files (Step S1003). As described above, when the value of the first additional information 501 is "0x32", for example, the value indicates that the relevant file is the moving image file being the second-half scene.

Next, the CPU 801 determines whether or not the detected numbers N1 and N2 are each larger than 0 (Step S1004). In other words, the CPU 801 determines whether or not at least one moving image file being the first-half scene and at least one moving image file being the second-half scene are recorded into the two recording media 116 and 118. As a result of the determination, when no moving image file being the first-half scene is recorded or when no moving image file being the second-half scene is recorded ("NO" in Step S1004), the processing is brought to an end.

When one or more moving image files being the first-half scenes and one or more moving image files being the second-half scenes are recorded ("YES" in Step S1004), the CPU 801 first selects one of the detected moving image files being the first-half scenes (Step S1005). Then, based on the pieces of second additional information 602 and 603, the CPU 801 detects the second-half scene being the moving image file continuous with the selected moving image file being the first-half scene (Step S1006). Specifically, based on the second additional information 602 of the selected moving image file being the first-half scene and the pieces of second additional information 603 of all of the moving image files being the second-half scenes, the CPU 801 examines whether or not those pieces of second additional information 602 and 603 satisfy the following conditions 1 to 4.

Condition 1: Recording modes are the same.
Condition 2: Recording apparatus are the same.

Condition 3: Difference between the recording date of the moving image file being the first-half scene and the recording date of the moving image file being the second-half scene is within one day.

Condition 4: A value obtained by advancing the end time code value of the moving image file being the first-half scene by a value corresponding to one frame matches the start time code value of the moving image file being the second-half scene.

When two moving image files satisfy all of those conditions 1 to 4, the CPU 801 determines that the two moving image files have been recorded continuously by the relay recording. When the moving image files that have been recorded continuously by the relay recording are found in this manner ("YES" in Step S1007), the CPU 801 performs the following processing. Specifically, the CPU 801 stores in the storage 803 the file number of the moving image file being the first-half scene and the file number of the moving image file being the second-half scene (Step S1008). On the other hand, when there is no continuous moving image file being the second-half scene ("NO" in Step S1007), the processing proceeds to Step S1009.

In Step S1009, the CPU 801 examines whether or not there is a remaining moving image file being the first-half scene. When there is no remaining moving image file being the first-half scene ("NO" in Step S1009), the CPU 801 brings the processing to an end. On the other hand, when there is a remaining moving image file being the first-half scene ("YES" in Step S1009), the CPU 801 selects the next moving image file being the first-half scene (Step S1010). Then, the processing returns to Step S1006, and the CPU 801 continues the processing.

Returning to the processing of FIG. 9, the CPU 801 determines, based on a result of the processing of Step S903, whether or not there are moving image files that have been recorded continuously to the two recording media 116 and 118 by the relay recording (Step S904). When there are moving image files that have been recorded continuously ("YES" in Step S904), the CPU 801 instructs the recording medium IF 806 to read out the moving image files having the file numbers stored in Step S1008 (Step S905). The recording medium IF 806 reads out the moving image files designated by the CPU 801 from the recording media 116 and 118, and stores the read moving image files in the storage 803. The CPU 801 then combines the moving image file being the first-half scene and the moving image file being the second-half scene that are stored in the storage 803 to generate a combined moving image file, and stores the combined moving image file in the storage 803. At this time, the moving image files are combined such that the moving image file being the second-half scene is combined after the moving image file being the first-half scene. It suffices in this case that the processing of combining the moving image files be simple binary-level combining.

On the other hand, when there are no moving image files that have been recorded continuously to the two recording media 116 and 118 by the relay recording ("NO" in Step S904), the CPU 801 displays on the display 804 the fact that the files that can be combined are not found (Step S907).

As described above, the two moving image files 401 and 402 that have been recorded continuously to both of the two recording media 116 and 118 are detected based on the additional information to be combined. Therefore, a series of moving images that have been divided to be recorded into a plurality of recording media 116 and 118 and combined into one moving image file can be acquired.

In this embodiment, the case where the recording medium IF 706 includes the two mounting portions and the recording media 116 and 118 are mounted to those mounting portions is described as an example, but the present invention is not limited thereto. For example, the image processing apparatus 800 may include a known USB communication part. In this case, a memory card reader or the like may be connected to the image processing apparatus 800 by USB so that the recording media 116 and 118 may be mounted to this card reader. As another example, the image recording apparatus 100 of FIG. 1 may also include a USB communication part. In this case, the image recording apparatus 100 and the image processing apparatus 700 may be connected to each other by USB under a state in which the two recording media 116 and 118 are mounted to the image recording apparatus 100 so that the image processing apparatus 700 may control the image recording apparatus 100 to perform the processing illustrated in FIG. 8 and FIG. 9.

Further, in the above, the image recording apparatus 100 and the image processing apparatus 800 are described as separate configurations, but the present invention is not limited thereto. For example, the image recording apparatus 100 may include the configuration of the image processing apparatus 800. Further, instead of the time code, information whose value increases by a predetermined value for each frame, for example, information indicating the number of frames from the first frame, may be recorded as items of the second additional information 601. In this case, as the condition 4, information on the number of frames may be used in place of the value of the time code.

As described above, according to this embodiment, during recording of moving image data into one recording medium among a plurality of recording media, whether or not to continue the recording of the moving image data into the one recording medium is determined based on predetermined information corresponding to the temperature of the one recording medium. Then, when it is determined that the recording of the moving image data into the one recording medium is not to be continued, the recording destination of the moving image data is switched to another recording medium different from the one recording medium. Thus, according to this embodiment, the image recording apparatus capable of securely recording the moving image data can be provided.

Second Embodiment

Figure 11:
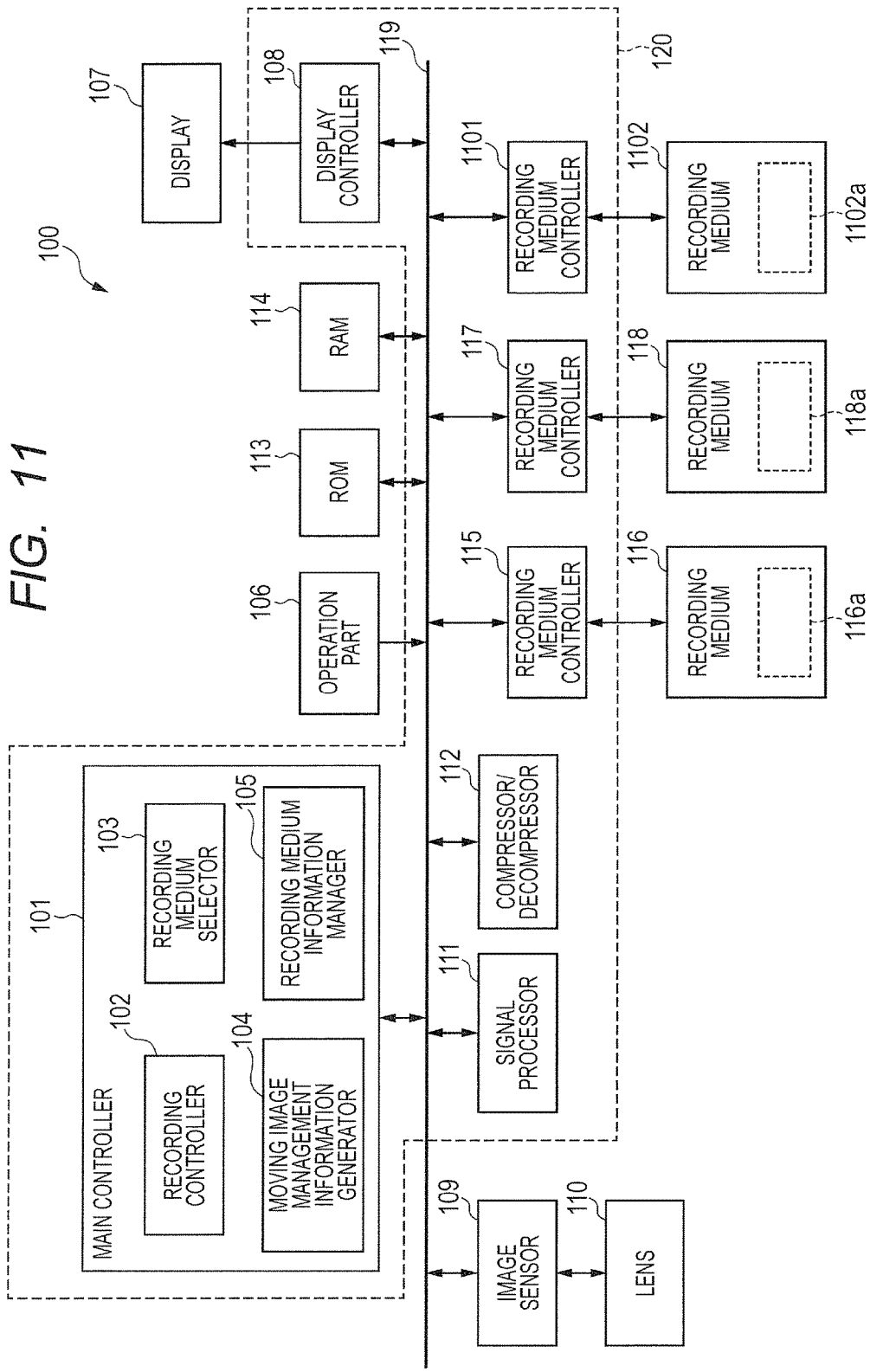
FIG. 11 is a block diagram for illustrating a configuration of an image recording apparatus according to a second embodiment of the present invention.

An image recording apparatus according to a second embodiment of the present invention is described with reference to FIG. 11 to FIG. 13. FIG. 11 is a block diagram for illustrating a configuration of the image recording apparatus according to this embodiment. In the image recording apparatus according to this embodiment, a recording medium controller 1101 is additionally provided to the image recording apparatus according to the first embodiment, and the moving image data can also be recorded into a recording medium 1102. The recording medium 1102 includes a temperature information generator 1102*a* configured to generate information on an internal temperature of the recording medium 1102, that is, temperature information thereof. As the temperature information generator 1102*a*, similarly to the temperature information generators 116*a* and 118*a*, a temperature sensor IC may be used, for example.

FIG. 13 is a table for showing management data indicating recordable rates corresponding to respective temperatures of the recording medium. The management data 1301 shown in FIG. 13 indicates recordable rates corresponding to respective temperatures of the recording medium 1102. An upper limit of a recording rate corresponding to the temperature of the recording medium 1102, that is, the recordable rate, is defined in advance. The recording medium information manager 105 holds the pieces of management data 201, 202, and 1301 indicating the recordable rates corresponding to the temperatures of the recording media 116, 118, and 1102, respectively. The recording medium information manager 105 detects the type of one of the recording media 116, 118, and 1102 mounted to the image recording apparatus 100, and based on a result of the detection, determines one of the pieces of management data 201, 202, and 1301 for the detected one of the recording media 116, 118, and 1102.

Figure 12:
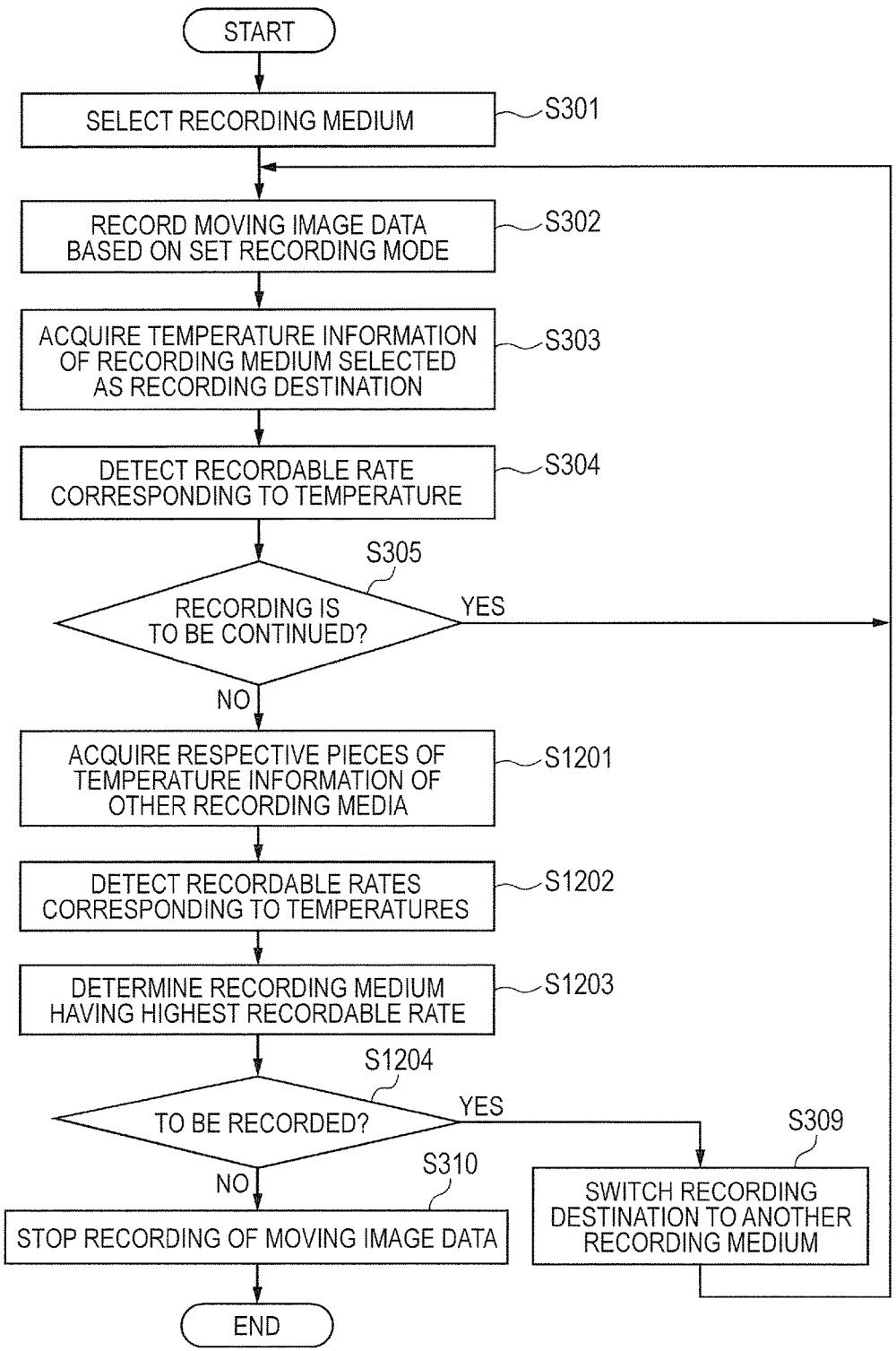
FIG. 12 is a flowchart for illustrating an operation of the image recording apparatus according to the second embodiment.

FIG. 12 is a flowchart for illustrating an operation of the image recording apparatus according to this embodiment. In the following, a case where the recording medium 116 is selected by the user as the recording destination of the moving image data is described as an example.

First, the operations of Step S301 to Step S305 are the same as those of the image recording apparatus according to the first embodiment described above with reference to FIG. 3, and hence description thereof is omitted. When it is determined that the recording of the moving image data into the recording medium 116 is not to be continued ("NO" in Step S305), the processing proceeds to Step S1201. When it is determined that the recording of the moving image data into the recording medium 116 is to be continued ("YES" in Step S305), the processing returns to Step S302.

In Step S1201, the recording medium information manager 105 acquires pieces of temperature information of all of the recording media 118 and 1102 other than the recording medium 116. In the following, a case where the temperature of the recording medium 118 is, for example, 82° C. and the temperature of the recording medium 1102 is, for example, 78° C. is described as an example.

In Step S1202, the recording medium information manager 105 detects the recordable rates of all of the recording media 118 and 1102 other than the recording medium 116 into which the moving image data is being recorded. The pieces of management data 202 and 1301 respectively indicating the recordable rates corresponding to the temperatures of the recording media 118 and 1102 are, as described above, held by the recording medium information manager 105. When the temperature of the recording medium 118 is 82° C., as can be understood from FIG. 2B, the recordable rate of the recording medium 118 is 240 MB/s, for example. When the temperature of the recording medium 1102 is 78° C., as can be understood from FIG. 13, the recordable rate of the recording medium 1102 is 250 MB/s, for example.

In Step S1203, the recording medium information manager 105 determines the recording medium having the highest recordable rate. In the following, a case where the recording medium having the highest recordable rate is the recording medium 1102 is described as an example. For example, the recording medium 1102 is determined as the recording medium having the highest recordable rate. In Step S1204, the recording medium information manager 105 determines whether or not to record the moving image data into the recording medium 1102 which is determined in Step S1203, for example. The recording medium information manager 105 determines whether or not to record the moving image data into the recording medium 1102 based on whether or not the recordable rate of the recording medium 1102 is equal to or higher than the predetermined transfer rate set in advance. As described above, the transfer rate of the moving image data is set to 100 MB/s, for example. As compared with this, as described above, the recordable rate of the recording medium 1102 is 250 MB/s, for example. In this case, the recordable rate of the recording medium 1102 is higher than the transfer rate of the moving image data. Therefore, in this case, the moving image data can be recorded into the recording medium 1102 without a problem. When it is determined that the moving image data is to be recorded into the recording medium 1102 ("YES" in Step S1204), the processing proceeds to Step S309. In Step S309, the recording destination of the moving image data is switched from the recording medium 116 to the recording medium 1102 by the recording medium selector 103. In this manner, the recording medium selector 103 functions as a controller configured to switch the recording destination of the moving image data to the recording medium having the highest upper limit of the recording speed. After that, the processing returns to Step S302. When it is determined that the moving image data is not to be recorded into the recording medium 1102 ("NO" in Step S1204), the processing proceeds to Step S310. Step S310 is the same as Step S310 according to the first embodiment, and hence description thereof is omitted.

As described above, three recording media 116, 118, and 1102 may be provided. In this embodiment, during recording of moving image data into one recording medium among a plurality of recording media, whether or not to continue the recording of the moving image data into the one recording medium is determined based on predetermined information corresponding to the temperature of the one recording medium. Then, when it is determined that the recording of the moving image data into the one recording medium is not to be continued, the recording destination of the moving image data is switched to another recording medium having the highest upper limit of a recording speed among a plurality of recording media other than the one recording medium. Thus, also according to this embodiment, the image recording apparatus capable of securely recording the moving image data can be provided.

In the above, the present invention is described in detail by way of the exemplary embodiments thereof. However, the present invention is not limited to those specific embodiments, and the present invention also encompasses various modes that do not depart from the gist of the present invention. Parts of the embodiments described above may be appropriately combined with each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the embodiments described above, the case where the temperature information of the recording medium 118 is acquired after the processing of Step S305 is described as an example, but the present invention is not limited thereto. For example, the temperature information of the recording medium 118 may be regularly acquired during the recording of the moving image data into the recording medium 116.

Further, in the embodiments described above, the case where the recording medium 116 is selected in advance by the user as the recording destination of the moving image data is described as an example, but the recording medium selected in advance by the user as the recording destination of the moving image data is not limited to the recording medium 116. In the case of the first embodiment, the recording medium 118 may also be selected in advance by the user as the recording destination of the moving image data. In this case, in Step S309, the recording destination of the moving image data is switched from the recording medium 118 to the recording medium 116. In the case of the second embodiment, the recording medium 118 or the recording medium 1102 may also be selected in advance as the recording destination of the moving image data. When the recording medium 118 is selected in advance as the recording destination of the moving image data in the second embodiment, in Step S309, the recording destination of the moving image data is switched to one of the recording medium 116 and the recording medium 1102 that has the highest recordable rate corresponding to current temperature of each recording medium. When the recording medium 1102 is selected in advance as the recording destination of the moving image data in the second embodiment, in Step S309, the recording destination of the moving image data is switched to one of the recording medium 116 and the recording medium 118 that has the highest recordable rate corresponding to current temperature of each recording medium.

Further, in the second embodiment, the case where the number of recording media is three is described as an example, but the number of recording media may be four or more.

Further, in the second embodiment, the case where the recording destination of the moving image data is switched to the recording medium having the highest recordable rate corresponding to current temperature of each recording medium is described as an example, but the present invention is not limited thereto. For example, when the recordable rate of the recording medium having the second highest recordable rate is equal to or higher than the transfer rate set in advance, the recording destination of the moving image may also be switched to this recording medium.

Further, in the embodiments described above, the case where the temperature sensor IC is used as each of the temperature information generators 116a, 118a, and 1202a is described as an example, but the present invention is not limited thereto. A temperature switch IC or the like may be used as each of the temperature information generators 116a, 118a, and 1202a. The temperature switch IC is a switch IC including a semiconductor temperature sensor to detect temperature. When the temperature changes from a normal temperature to reach a set detection temperature, the output of the temperature switch IC is inverted, and the output returns to an original value when the temperature decreases to a reset temperature. When the temperature switch IC is used to form each of the temperature information generators 116a, 118a, and 1202a, a signal output from each of the temperature information generators 116a, 118a, and 1202a has a binary value. When a signal output from one of the temperature information generators 116a, 118a, and 1202a is not inverted, it is determined that data can be written to a corresponding one of the recording media 116, 118, and 1102 at a predetermined transfer rate. On the other hand, when the signal output from one of the temperature information generators 116a, 118a, and 1202a is inverted, it is determined that data cannot be written to a corresponding one of the recording media 116, 118, and 1102 at the predetermined transfer rate.

Further, in the embodiments described above, the case where the temperature information is generated by the recording media 116, 118, and 1102 and the generated temperature information is read out from the recording media 116, 118, and 1102 is described as an example, but the present invention is not limited thereto. For example, information corresponding to the temperature may be generated by the recording media 116, 118, and 1102, and the information corresponding to the temperature may be read out from the recording media 116, 118, and 1102. Examples of the information corresponding to the temperature include information indicating the recordable rate of one of the recording media 116, 118, and 1102. In other words, the recordable rate corresponding to the temperature of one of the recording media 116, 118, and 1102 may be generated on the one of the recording media 116, 118, and 1102 side, and the generated recordable rate may be read out from the one of the recording media 116, 118, and 1102. In this case, information generators 116a, 118a, and 1102a each having both a function of measuring the temperature and a function of calculating a recordable rate corresponding to the temperature are provided to the recording media 116, 118, and 1102, respectively. Each of the information generators 116a, 118a, and 1102a may be formed of a multi-function IC having a sensor function, a memory function, and a calculation function, for example. In this case, the pieces of management data 201, 202, and 1301 respectively indicating the recordable rates corresponding to the temperatures of the recording media 116, 118, and 1102 are held by, for example, the information generators 116a, 118a, and 1102a, respectively. The information generators 116a, 118a, and 1102a generate information on the recordable rates corresponding to the internal temperatures of the recording media 116, 118, and 1102, respectively.

Further, in the embodiments described above, the case where the temperature information inside the recording media 116, 118, and 1102 is used is described as an example, but the present invention is not limited thereto. For example, temperatures of surfaces of the recording media 116, 118, and 1102 may also be used as the temperature information. In this case, it suffices that temperature sensors configured to measure the temperatures of the surfaces of the recording media 116, 118, and 1102 be provided separately from the recording media 116, 118, and 1102, respectively, so that output from those temperature sensors may be used.

This application claims the benefit of Japanese Patent Application No. 2016-053881, filed Mar. 17, 2016, which is hereby incorporated by reference herein in its entirety.

What is claimed is:

1. A recording apparatus, comprising:
a recorder that records moving image data into a recording medium designated as a recording destination among a plurality of recording media;
a reader that reads out, from the recording medium, temperature information on a current temperature of the recording medium; and
a controller that controls the recorder based on a recording speed corresponding to a temperature indicated by the temperature information read out by the reader,
wherein the controller controls, if a recording speed corresponding to a temperature indicated by first temperature information read out by the reader from a first recording medium designated as the recording destination during recording of the moving image data into the first recording medium is lower than a predetermined recording speed, the recorder to switch the recording destination from the first recording medium to another recording medium and continuously record the moving image data into the another recording medium, and
wherein the controller switches the recording destination to one of a plurality of recording media other than the first recording medium that has a highest recording speed among recording speeds corresponding to temperatures respectively indicated by a plurality of pieces of temperature information read out from the plurality of recording media other than the first recording medium.

2. The recording apparatus according to claim 1, wherein the controller switches the recording destination from the first recording medium to the another recording medium if the recording speed corresponding to the temperature indicated by the first temperature information read out from the first recording medium during the recording of the moving image data into the first recording medium is lower than the predetermined recording speed, and if a recording speed corresponding to a temperature indicated by second temperature information read out by the reader from the another recording medium during the recording of the moving image data into the first recording medium is not lower than the predetermined recording speed.

3. The recording apparatus according to claim 1, wherein the controller detects the recording speed corresponding to the temperature indicated by the temperature information read out by the reader from the recording medium based on management information indicating recording speeds corresponding respectively to a plurality of temperatures of the recording medium.

4. The recording apparatus according to claim 3, further comprising a storage storing the management information.

5. The recording apparatus according to claim 3, wherein the controller acquires the management information from each of the plurality of recording media.

6. The recording apparatus according to claim 1,
wherein each of the plurality of recording media comprises a temperature sensor that detects a temperature of the each of the plurality of recording media, and
wherein each of the plurality of recording media that outputs to the reader the temperature information indicating the temperature detected by the temperature sensor in response to a command from the reader to request the temperature information.

7. A recording apparatus, comprising:
a recorder that records moving image data into a recording medium designated as a recording destination among a plurality of recording media;
a reader that reads out, from the recording medium, temperature information on a current temperature of the recording medium; and
a controller that controls the recorder based on a recording speed corresponding to a temperature indicated by the temperature information read out by the reader,
wherein the controller controls, if a recording speed corresponding to a temperature indicated by first temperature information read out by the reader from a first recoding medium designated as the recording destination during recording of the moving image data into the first recording medium is lower than a predetermined recording speed, the recorder to switch the recording destination from the first recording medium to another recording medium and continuously record the moving image data into the another recording medium,
wherein the recording apparatus further comprises a mode setter that sets, in accordance with an instruction given by a user, one of a plurality of recording modes having different data rates of the moving image data to be recorded by the recorder,
wherein the predetermined recording speed is a recording speed corresponding to the one of the plurality of recording modes set by the mode setter, and
wherein the controller switches, based on a current recording mode set by the mode setter, the recording destination from the first recording medium to the another recording medium if the recording speed corresponding to the temperature indicated by the first temperature information is lower than the predetermined recording speed corresponding to the current recording mode.

8. The recording apparatus according to claim 7, further comprising a compressor that compresses moving image data,
wherein the recorder records the moving image data compressed by the compressor, and
wherein the compressor, in the plurality of recording modes, outputs pieces of compressed moving image data having different data rates.

9. The recording apparatus according to claim 1, further comprising an image sensor,
wherein the recorder records moving image data acquired by the image sensor.

10. A recording method, comprising:
recording moving image data into a recording medium designated as a recording destination among a plurality of recording media;
reading out, from the recording medium, temperature information on a current temperature of the recording medium; and
controlling the recording the moving image data based on a recording speed corresponding to a temperature indicated by the temperature information read out in the reading out,
wherein the controlling, if a recording speed corresponding to a temperature indicated by first temperature information read out in the reading out from a first recording medium designated as the recording destination during recording of the moving image data into the first recording medium is lower than a predetermined recording speed, switches the recording destination from the first recording medium to another recording medium so as to continuously record the moving image data into the another recording medium, and wherein, during the controlling, the recording destination is switched to one of a plurality of recording media other than the first recording medium that has a highest recording speed among recording speeds corresponding to temperatures respectively indicated by a plurality of pieces of temperature information read out from the plurality of recording media other than the first recording medium.

* * * * *